United States Patent Office 2,723,445
Patented Nov. 15, 1955

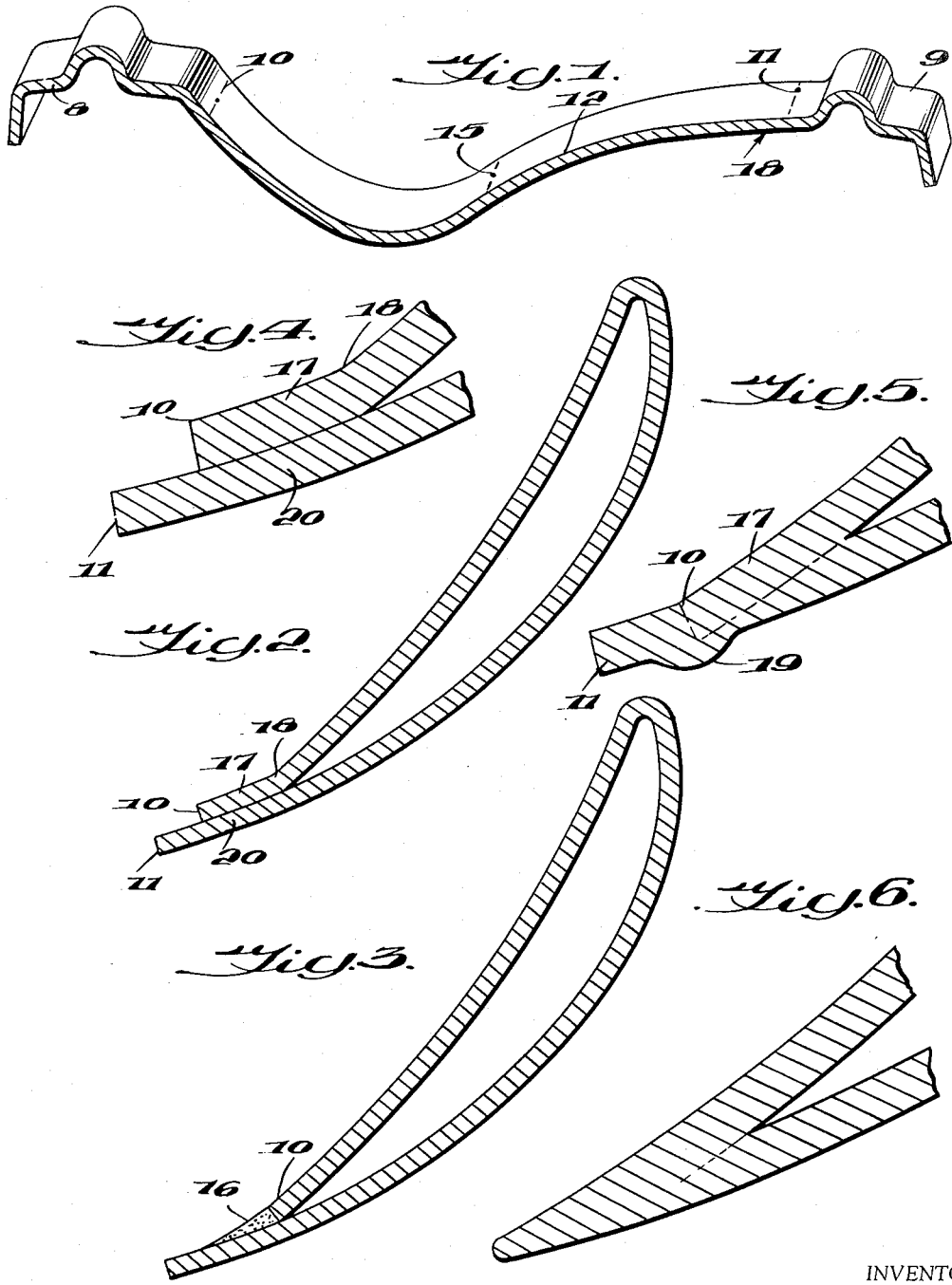

2,723,445

METHOD OF MAKING A HOLLOW TURBINE BLADE

George Trautvetter, Jenkintown, Pa., assignor to Heintz Manufacturing Company, Philadelphia, Pa., a corporation of Pennsylvania Application June 10, 1952, Serial No. 292,675

3 Claims. (Cl. 29—156.8)

This invention relates to a method of welding an edge of a sheet metal member to a sheet metal surface and more particularly the invention is directed to a method of preparing members for welding in a manner which will substantially eliminate distortion in the steel alloys caused by the welding operation. The invention has particular application to the formation of hollow turbine blades for high speed engines in which it is extremely important to have a small tolerance, particularly with regard to maintaining the desired curvature of the turbine blade airfoil.

It is well known to those familiar with the fabrication of sheet metal parts that considerable objectionable distortion occurs in the sheet metal parts due to the welding procedure and the heat from the welding. In connection with the fabrication of hollow turbine blades, considerable research has been directed to methods of fabrication to eliminate distortion, but all have proven expensive and impractical. One method of fabricating has been to roll a constant open section on a Yoder machine and to weld in approximately the desired shape. The hollow section is then filled with Kirksite and then hit in a die in order to produce the proper contours. The Kirksite must be melted from the blade and can be used again. It can be readily understood that this is a slow process and naturally expensive. It does not permit the producing of a uniform product within the tolerances required and rejects have been extremely high.

Another method of fabricating is to form a stamping of the proper shape in the flat and then to fold the stamping to the desired shape of the blade. This method is satisfactory up to the point of welding, but it has been found that it is impossible to weld without producing distortion which may be removed only by rehitting or reshaping of the blade after welding.

The present method is an improvement in the method above described in which there is performed an added step of preparing the blade for welding so as to eliminate substantially all of the distortion during the welding operation. Broadly, the method comprises stamping or stretching a blank to the desired shape in the flat, folding the blank so that one edge slightly overlaps the opposite edge slightly, and hitting the overlapping edges in a male and female die arrangement to force the overlapped edge of the blade into the plane of the surface of the adjoining edge portion of the blade. A bead is formed on the opposite side of the surface into which the blade edge is forced and this bead serves to reinforce the blade at the exact point of welding so as to prevent distortion.

It has also been found that when, according to the invention, the blade is formed before welding, only one pass of a heli-arc weld is necessary to complete the joining of the edge to the surface into which it is embedded. It has been found that, in other procedures, two or three passes of welding are required. It should be apparent, therefore, that the reduction of the number of passes of welding will also reduce the amount of distortion in the blade.

It is, therefore, an object of the invention to prepare a sheet metal member for welding so that the welding operation will not produce objectionable distortion.

It is a further object of the invention to provide a method for joining an edge of a sheet metal member to a sheet metal surface, which method includes the formation of a reinforcing configuration in the sheet metal surface to prevent distortion during the welding operation.

It is another object of the invention to provide a method for joining a sheet metal edge to a sheet metal surface, which method includes the preforming and arranging of the members to reduce the number of welding passes in the joining operation.

These and other objects will become apparent from the following description having reference to the accompanying drawing in which:

Figure 1 is a perspective view, partly in section, of a blank of a turbine blade having the required contours but before folding to form the hollow blade;

Figure 2 is a sectional view of a hollow turbine blade after the folding operation;

Figure 3 is a sectional view of a hollow turbine blade formed in a conventional manner;

Figure 4 is a fragmentary sectional view of the hollow turbine blade at one step in the forming operation;

Figure 5 is a fragmentary sectional view of a hollow turbine blade at a later step in the forming operation; and Figure 6 is a fragmentary sectional view of a hollow turbine blade after the joining operation has been completed.

The first step in the operation is the cutting of a blank from sheet steel, A. M. S. 5521, to approximately the size needed for the complete turbine blade. Allowance should be made at two opposite edges of the blank so that there is sufficient excess metal to enable the blank to be securely gripped at the two opposite edges for the first step in the operation. The blank is clamped at the location of the excess metal and placed between two mating dies. The dies have the configuration as shown in Figure 1, which configuration is necessary to form the correct contours which the finished turbine blade surfaces will have.

The dies actually stretch the sheet metal into the desired shape because the sheet metal member is securely clamped at the edge portions indicated at 8 and 9 in Figure 1. The blank 12 thus formed is cut along its lateral edges 10 and 11 along lines which are indicated by the numerals 13 and 14.

The blank shown in Figure 1 is folded to form the shape of the turbine blade before welding. The line of folding is approximately at the portion indicated by the numeral 15. In the method used prior to the invention, the blade would have the configuration shown in Figure 3, and it would be necessary to weld the edge 10 to the adjoining surface of the blade at 16. The weld metal and the edge 11 would then be machined to form the trailing edge as shown in Figure 6.

According to the present invention, on the other hand, the blade is folded over and a small portion 17 (Figure 2) adjacent the edge 10 is caused to lie flat on the surface 20 and spaced from the edge 11, as shown in Figure 4. The location of the slight bend 18 is also shown in Figures 1 and 2 to indicate the approximate width of the flat portion 17 in relation to the whole blank.

The blank is placed in a male and female die arrangement with the surface 20 (see enlarged view, Figure 4) adjacent the female half of the die. The female half of the die would have a shape conforming to the bead 19 in Figure 5. The blank is then hit in the die to force the edge 10 into the plane of the sheet metal surface 20 while simultaneously forming the bead 19.

The resulting structure, as shown in Figure 5, can be welded either from the side of bead 19 or from the opposite side. In either case, the bead is necessary to prevent distortion during the welding operation. If the welding is done through the bead (a heli-arc method has been found to be desirable), it is not necessary to remove excessive metal from the bead surface. On the other hand, if the welding is done on the surface opposite to the bead, the bead can be machined off in order to follow the proper contour. Regardless of the side from which the welding is done, only one pass of welding is required.

After the welding operation, the blank is machined to give the trailing edge the configuration of Figure 6. Obviously, it is necessary to perform the machining operation with either forming operation, that is, the operation indicated generally in Figure 3 or the forming operation according to the present invention.

While the invention has been described with particularity to the fabrication of hollow turbine blades from sheet steel alloys, it is to be understood that the general principle of the operation described has many other applications, particularly in the fabrication of sheet metal parts. It is, therefore, to be understood that the invention is not limited to the construction of hollow turbine blades, but is to be limited only within the scope of the accompanying claims.

I claim:

1. A method of preparing a hollow turbine blade from a sheet metal alloy comprising the steps of folding a blank along the length thereof with a first edge engaging a surface of said blank adjacent the opposing edge, forcing said first edge into said engaged surface thereby forming a bead on the reverse side of the surface, welding said first edge to said surface, the presence of the bead preventing distortion during the welding, and machining the trailing edge portion to produce a blade whose outer surfaces converge smoothly into the trailing edge.

2. The method according to claim 1 in which said welding is performed on the bead side of the folded blade.

3. The method according to claim 1 in which said welding is performed on the side of the folded blade opposite from the bead side.

References Cited in the file of this patent

UNITED STATES PATENTS

| | | |
|---|---|---|
| 555,575 | Lake et al. | Mar. 3, 1896 |
| 747,583 | Boyle et al. | Dec. 22, 1903 |
| 994,166 | Kienast | June 6, 1911 |
| 1,765,368 | Frahm et al. | June 24, 1930 |
| 1,786,759 | Lawson | Dec. 30, 1930 |
| 1,817,556 | Hamilton | Aug. 4, 1931 |
| 2,567,012 | Donelan | Sept. 4, 1951 |
| 2,601,969 | Eastman | July 1, 1952 |

FOREIGN PATENTS

| | | |
|---|---|---|
| 710,289 | Germany | Sept. 9, 1941 |
| 133,353 | Australia | July 14, 1949 |
| 852,786 | Germany | Oct. 20, 1952 |